(12) United States Patent
Gage

(10) Patent No.: US 8,473,853 B2
(45) Date of Patent: *Jun. 25, 2013

(54) MULTIPLE DOCUMENT VIEWING APPARATUS AND USER INTERFACE

(75) Inventor: Cynthia Joanne Gage, Agoura Hills, CA (US)

(73) Assignee: S.F. IP Properties 56 LLC, Wilmington, DE (US)

( * ) Notice: Subject to any disclaimer, the term of this patent is extended or adjusted under 35 U.S.C. 154(b) by 485 days.

This patent is subject to a terminal disclaimer.

(21) Appl. No.: 11/748,404

(22) Filed: May 14, 2007

(65) Prior Publication Data

US 2007/0240033 A1     Oct. 11, 2007

Related U.S. Application Data

(63) Continuation of application No. 10/842,913, filed on May 11, 2004, now Pat. No. 7,237,202.

(51) Int. Cl.
*G09G 5/12* (2006.01)
*G06F 3/14* (2006.01)

(52) U.S. Cl.
USPC ............................................ 715/761; 345/1.3

(58) Field of Classification Search
USPC .................. 715/761, 750; 345/1.3, 5, 31, 903
See application file for complete search history.

(56) References Cited

U.S. PATENT DOCUMENTS

| | | | |
|---|---|---|---|
| 3,248,705 A | 4/1966 | Dammann et al. | |
| 3,525,079 A | 8/1970 | Cuccio | |
| 4,717,911 A | 1/1988 | Matsuura et al. | |
| 5,142,619 A | 8/1992 | Webster, III | |
| 5,233,502 A * | 8/1993 | Beatty et al. | 361/679.09 |
| 5,276,796 A | 1/1994 | Yamada et al. | |
| 5,369,704 A | 11/1994 | Bennett et al. | |
| 5,590,021 A | 12/1996 | Register | |
| 5,687,939 A | 11/1997 | Moscovitch | |
| 5,704,029 A | 12/1997 | Wright | |
| 5,949,643 A | 9/1999 | Batio | |
| RE36,978 E | 12/2000 | Moscovitch | |

(Continued)

FOREIGN PATENT DOCUMENTS

| | | |
|---|---|---|
| JP | 2000-284253 | 10/2000 |
| JP | 2003-255919 | 9/2003 |
| WO | 9949383 A1 | 9/1999 |

OTHER PUBLICATIONS

"Foreign Notice of Allowance", Application Serial No. 200580018015.X, (Jul. 10, 2009), 6 pages.

(Continued)

*Primary Examiner* — Namitha Pillai
(74) *Attorney, Agent, or Firm* — Brundidge & Stanger, P.C.

(57) ABSTRACT

An apparatus for display of multiple electronic documents. The apparatus includes one or more tilting, rotatable, and detachable display devices coupled to a display stand, or to a personal computer or other data processing apparatus via a hinge or the like. A screen control user interface running on the data processing apparatus is provided for switching electronic documents between the various display devices. One or more of the display devices may include a local memory, power supply, and application software so that the screen can be detached from the multiple document display apparatus and still display an electronic document. The displayed electronic document may then be marked up by a second user and returned to a first user for editing purposes.

33 Claims, 12 Drawing Sheets

U.S. PATENT DOCUMENTS

| | | | |
|---|---|---|---|
| 6,222,507 | B1 | 4/2001 | Gouko |
| 6,282,510 | B1 | 8/2001 | Bennett et al. |
| 6,532,146 | B1 | 3/2003 | Duquette |
| 6,560,620 | B1 | 5/2003 | Ching |
| 6,573,913 | B1 * | 6/2003 | Butler et al. ............ 715/761 |
| 6,643,124 | B1 | 11/2003 | Wilk |
| 6,844,865 | B2 * | 1/2005 | Stasko .................. 345/1.3 |
| 2001/0054986 | A1 | 12/2001 | Leman |
| 2002/0067319 | A1 | 6/2002 | Hensel |
| 2002/0080095 | A1 | 6/2002 | O'nan |
| 2002/0109665 | A1 * | 8/2002 | Matthews et al. ........ 345/156 |
| 2002/0135535 | A1 | 9/2002 | Muller |
| 2002/0140628 | A1 | 10/2002 | Morrone |
| 2003/0001795 | A1 | 1/2003 | Stasko |
| 2003/0095373 | A1 | 5/2003 | Duquette |
| 2003/0161094 | A1 | 8/2003 | Chambers |
| 2003/0163429 | A1 | 8/2003 | Humbeutel et al. |
| 2003/0227438 | A1 | 12/2003 | Campbell |
| 2004/0012538 | A1 | 1/2004 | Bhogal |
| 2004/0066408 | A1 | 4/2004 | Meyers |
| 2005/0082439 | A1 * | 4/2005 | Ho ...................... 248/121 |

OTHER PUBLICATIONS

ITworld Staff, "WORLDBEAT—Buyers at Computex get look at detachable display prototypes", http://www.itworld.com/020611computex on Dec. 23, 2009, (Jun. 11, 2002), pp. 1-2.

"Foreign Office Action", Application Serial No. 2006-7026064, (May 12, 2010), 5 pages.

USPTO; Office Action dated Oct. 22, 2006 in U.S. Appl. No. 10/842,913.

USPTO; Notice of Allowance dated Mar. 28, 2007 in U.S. Appl. No. 10/842,913.

"Foreign Office Action", Japanese Application 2007-513291, (Sep. 22, 2010), 3 pages.

Office Action from EP Application No. 05748198.8-1902 dated Mar. 20, 2013.

* cited by examiner

MULTIPLE DOCUMENT VIEWING APPARATUS AND USER INTERFACE

CROSS-REFERENCE TO RELATED APPLICATION(S)

This application is a continuation of U.S. patent application Ser. No. 10/842,913, filed May 11, 2004, issued as U.S. Pat. No. 7,237,202 the content of which is incorporated by reference as if set forth in full herein.

BACKGROUND OF THE INVENTION

This invention pertains generally to apparatuses for viewing, researching, reviewing, and editing electronic documents and more specifically to viewing, researching, reviewing, and editing multiple electronic documents simultaneously.

In the last decade, technology has changed the manner in which education and research is effectuated in most homes and classrooms. Almost every university in the United States now has an electronic aspect included in its curriculum, ranging from classes being completely offered online, to providing online libraries and research tools. CD-ROMs often replace reference books, instruction manuals, and trouble-shooting and help manuals. A dictionary or textbook may no longer be sitting next to a student on a desk, but all of its contents may be available 24 hours, seven days a week, upon a click of a mouse. Reference materials are also offered over the Internet via web pages or on CD-ROMs, and often replace their paper counterparts.

School assignments may further be posted electronically. Some of these assignments are conducted in teams or groups, where each team or group member contributes his or her share for completing the assignment. Such team assignments or study group collaborations are often exchanged via e-mail, and may go through many revisions and edits. Conducting such edits or performing other types of research generally requires one to make a print-out of a document being reviewed or edited, generating a paper version of the document. Once the research or editing has been completed, the print-out of the document is often discarded. This creation, use, and then discarding of paper copies is wasteful and expensive as well as time consuming.

Therefore, a need exists for an apparatus and a method for displaying one or more versions of a document for viewing, comparing, and editing purposes. A user interface for such an apparatus should be simple and convenient to use. In addition, the apparatus should be easily portable and include detachable displays with memory and editing capabilities. Various aspects of the present invention meet such a need as well as the needs of other possible applications.

SUMMARY OF THE INVENTION

According to one embodiment, the present invention is directed to a computer display system that includes a data processing apparatus and a first display device in communication with the data processing apparatus. The data processing apparatus includes a first display screen, a first user input device, and a processor that is coupled to the first display screen and the first user input device. The processor provides a graphics user interface including a plurality of operation selection icons on the first display screen. The first display device includes a second display screen. A user selects a first operation selection icon on the graphics user interface using the first user input device, and in response, the processor applies a first operation with respect to the second display screen.

The operation may include moving an image between the first display screen and the second display screen, invoking the second display screen as a current working screen, and/or hiding an image displayed on the second display screen.

According to another embodiment, the present invention is directed to a display apparatus in a computer display system. The computer display system includes a data processing apparatus with a first display screen, a first user input device, and a processor coupled to the first display screen and the first user input device. The processor provides a graphics user interface including a plurality of operation selection icons on the first display screen. The display apparatus includes a display stand and a first display device with a second display screen coupled to the display stand. A user selects a first operation selection icon on the graphics user interface using the first user input device, and in response, the processor applies a first operation with respect to the second display screen.

According to another embodiment, the present invention is directed to a data processing apparatus in a computer display system. The computer display system includes a first display device with a first display screen. The data processing apparatus includes a second display screen, a user input device, and a processor. The second display screen displays a graphics user interface including a plurality of operation selection icons. The user input device selects a first operation selection icon from the graphics user interface. The processor provides the graphics user interface on the second display screen and applies a first operation with respect to the first display screen in response to the selection of the first operation selection icon.

According to a further embodiment, the present invention is directed to a method for manipulating images displayed on a computer display system. The computer display system includes a data processing apparatus with a first display screen and a first user input device, and a first display device in communication with the data processing apparatus, the first display device including a second display screen. The method includes providing on the first display screen a graphics user interface including a plurality of operation selection icons. The method also includes receiving, via the first user input device, a user selection of a first operation selection icon from the graphics user interface. The method further includes applying a first operation with respect to the second display screen in response to the selection of the first operation selection icon.

According to another embodiment, the present invention is directed to a method for manipulating images displayed on a computer display system. The computer display system includes a data processing apparatus with a first display screen and a first user input device, and a display apparatus in communication with the data processing apparatus. The display apparatus includes a display stand and a first display device coupled to the display stand. The first display device includes a second display screen and a second user input device. The method for manipulating images includes providing on the first display screen a graphics user interface including a plurality of operation selection icons; displaying on the first display screen an electronic document; receiving, via the first user input device, a user selection of a first operation selection icon from the graphics user interface; moving the display of the electronic document from the first display screen to the second display screen in response to the user selection of the first operation selection icon; detaching the first display device from the display stand while the electronic document is displayed on the second display screen; receiving a user annotation with respect to the electronic document displayed on the second display screen, the annotation being entered using the second user input device while the first display device is detached from the display stand; displaying the user annotation on the second display screen; reattaching the first display device on the display stand; and performing an operation on the electronic document displayed on the second display screen via the first user input device.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
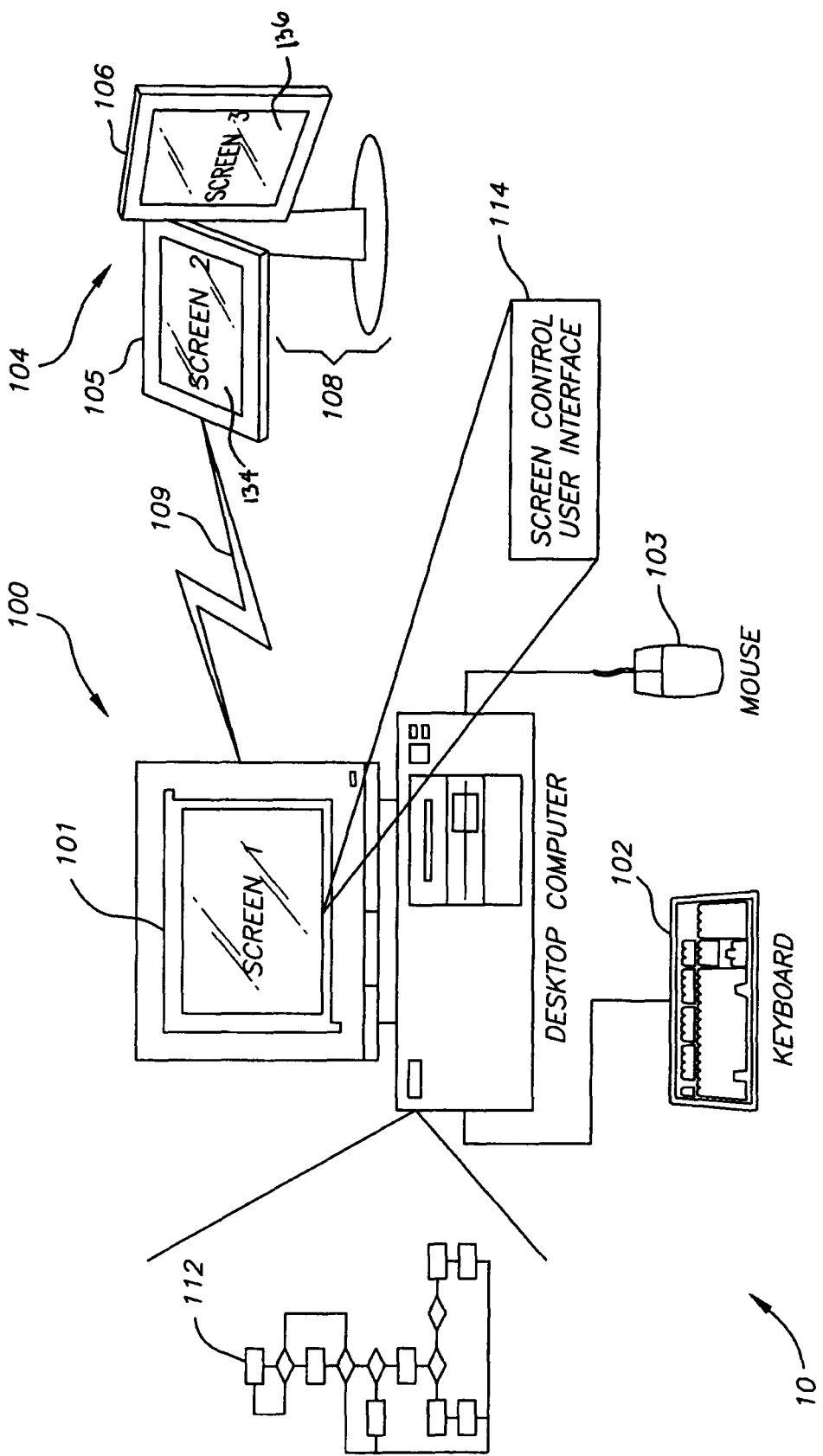
FIG. 1 is a block diagram illustrating a computer display system including a multiple document display apparatus in accordance with an exemplary embodiment of the present invention.

FIG. 1 is a block diagram illustrating a computer display system 10 in accordance with an exemplary embodiment of the present invention. The computer display system 10 includes a multiple document display apparatus 104 coupled to a data processing apparatus 100 over a wired or wireless data communications link 109.

The data processing apparatus 100 may take the form of a personal computer (PC) or laptop conventional in the art. The data processing apparatus includes a display screen 101 and one or more user input devices such as, for example, a keyboard 102 and a mouse 103.

The multiple document display apparatus 104 includes a plurality of electronic display devices, such as display device 105 and display device 106. Each display device 105, 106 is removably, rotatably, and/or tiltably coupled to a display stand 108. A user may position each screen 134, 136 of the display devices 105, 106 so that they are individually in a "landscape" or "portrait" mode for display of electronic documents. For example, display device 105 is illustrated as being in a "landscape" position while display device 106 is illustrated in a "portrait" position. In addition, a user may tilt the screens independently for better viewing. Finally, one or more of the screens may be detached from the display stand while still displaying an electronic document.

According to one embodiment of the invention, the data processing apparatus 100 hosts a screen control software application 112 that provides a screen control user interface 114. The screen control user interface allows a user to manipulate the display of one or more documents on the display screen 101 as well as on the display devices 105, 106 of the multiple document display apparatus 104.

Figure 2:
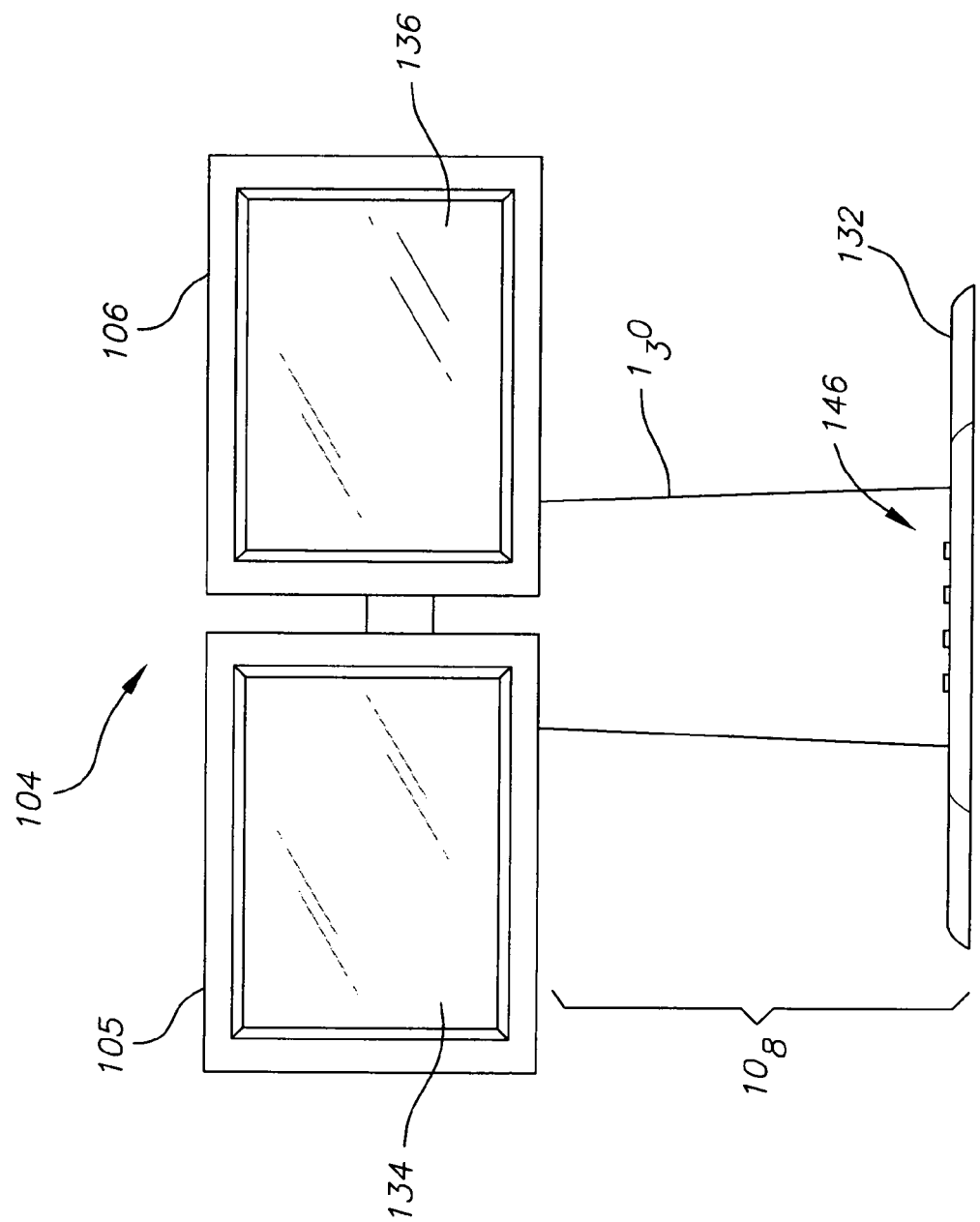
FIGS. 2-6 are various views of the multiple document display apparatus of FIG. 1 according to one embodiment of the invention.
Figure 3:
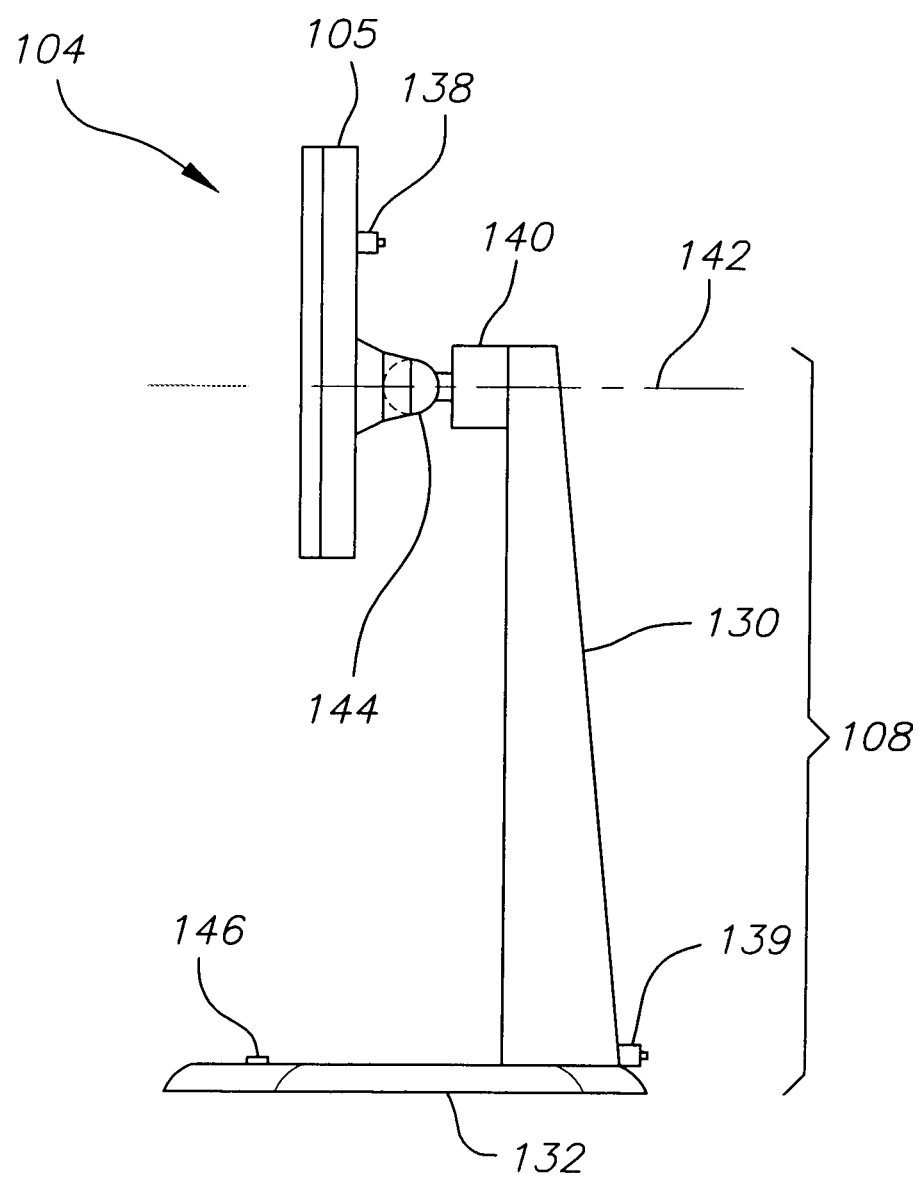
Figure 4:
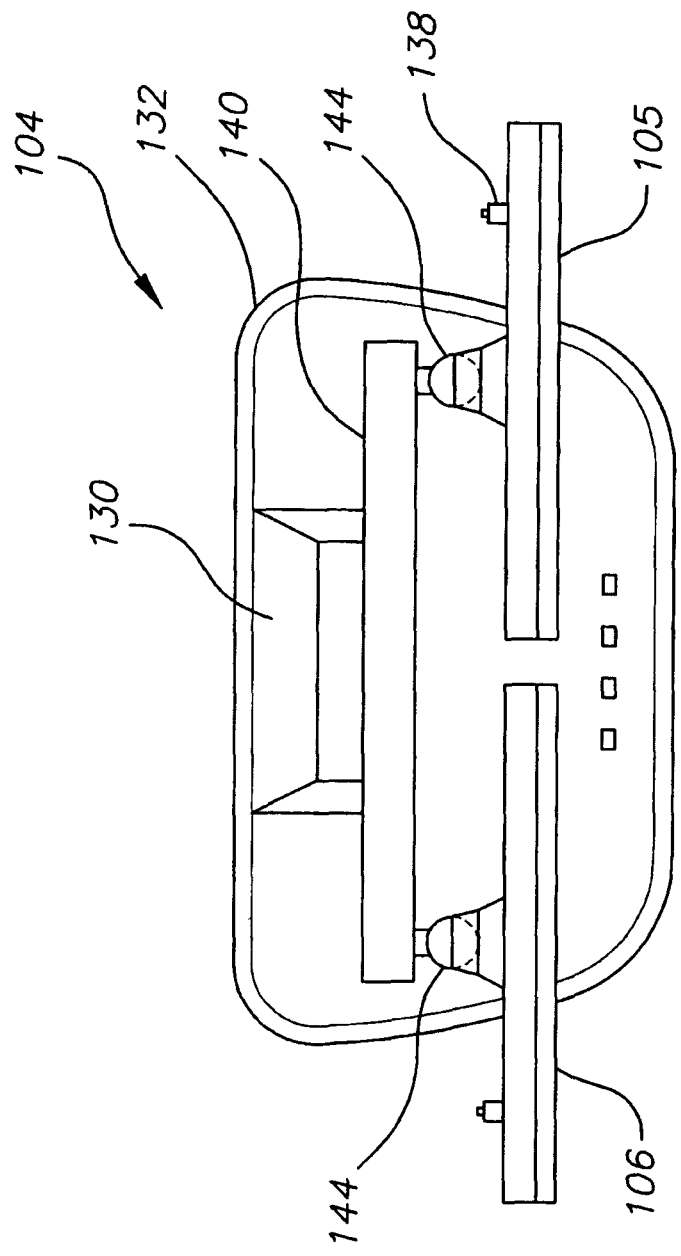
Figure 5:
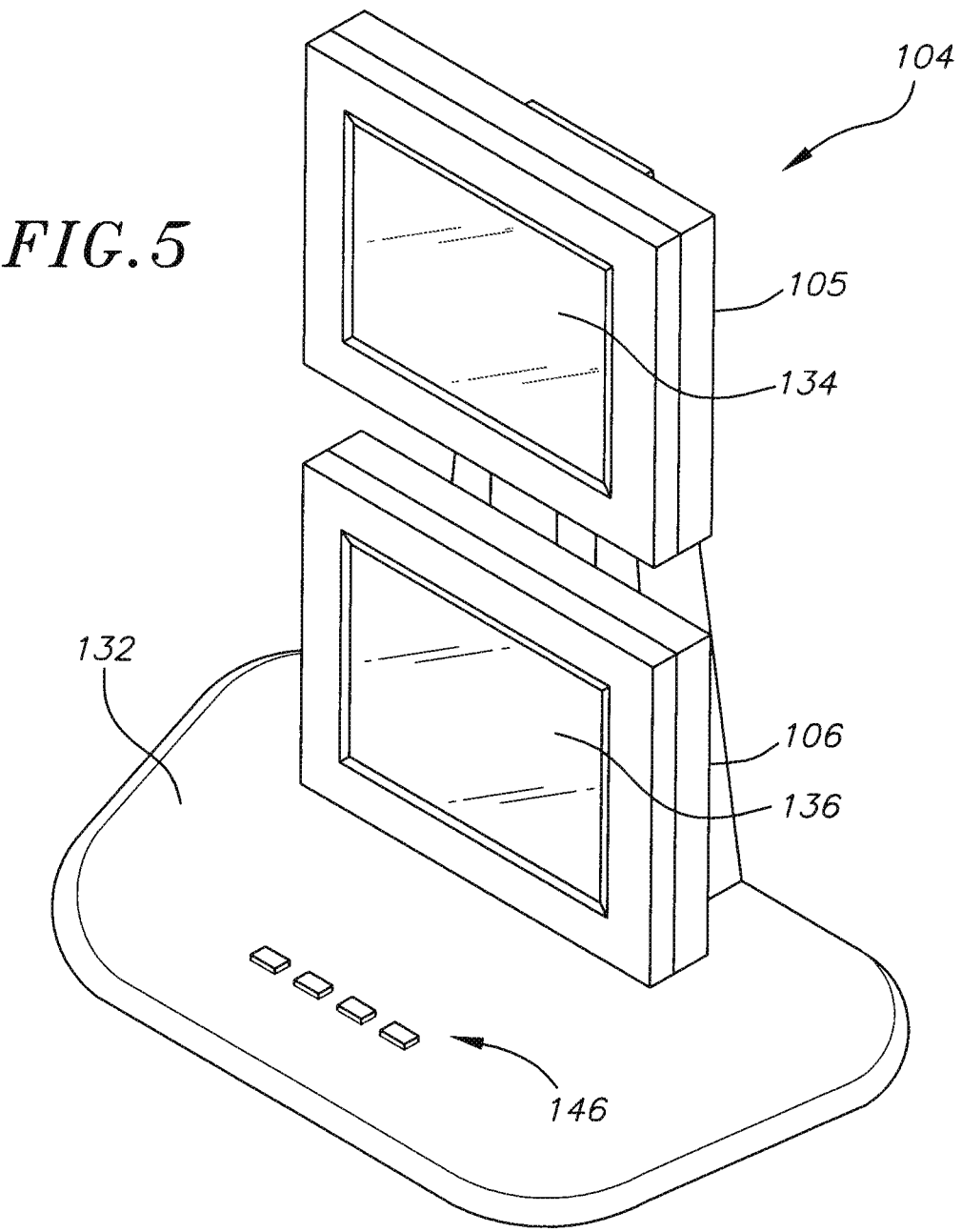
Figure 6:
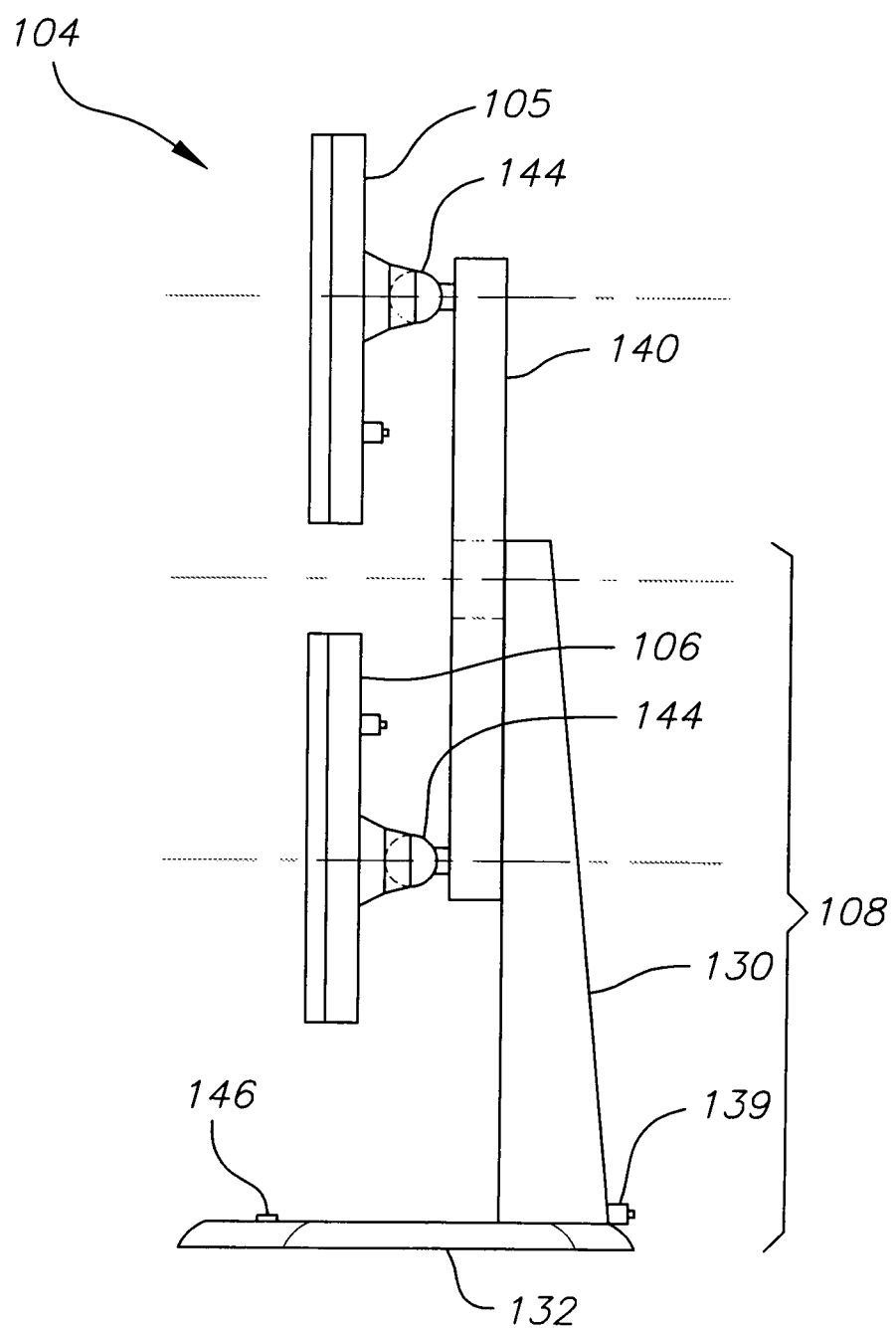

FIGS. 2-6 are various views of the multiple document display apparatus 104 according to one embodiment of the invention. The display apparatus 104 includes an arm 140 for mounting the display devices 105, 106 onto the display stand 108. The arm 140 is supported by a substantially vertical or curved support 130 which in turn rests on a base 132 forming part of the display stand. A rotary joint (not shown) coupling the arm 140 to the vertical support 130 allows the arm to be freely rotated about a horizontal axis 142 through the vertical support 130, into a horizontal or vertical resting arm position. The display devices 105, 106 are said to be in a horizontal, side-by-side orientation as shown in FIGS. 2-4 if the arm 140 is rotated into the horizontal arm position. The display devices 105, 106 are said to be in a vertical, top-down orientation as shown in FIGS. 5-6 if the arm 140 is rotated into the vertical arm position.

According to one embodiment of the invention, each display device 105, 106 is mounted on the arm via a ball joint 144 that allows the display device to be tilted and rotated about the arm 140. Each display device 105, 106 may be independently removed from the display stand by detaching the display device from the ball joint 144. A person of skill in the art should recognize that other types of joints known in the art may be equally suitable as long as the chosen joint allows each display device 105, 106 to be removably, rotatably, and/or tiltably coupled to the display stand 108.

According to one embodiment of the invention, control buttons 146 controlling one or both of the display devices 105, 106 may be incorporated in the display stand 108, such as, for example, into the base 132 of the multiple document display apparatus 104. The display stand 108 may further include a power source 139 for providing power to one or both of the display devices 105, 106. The type of power provided by the power source 139 may be, for example, an alternating current (AC).

Figure 7:
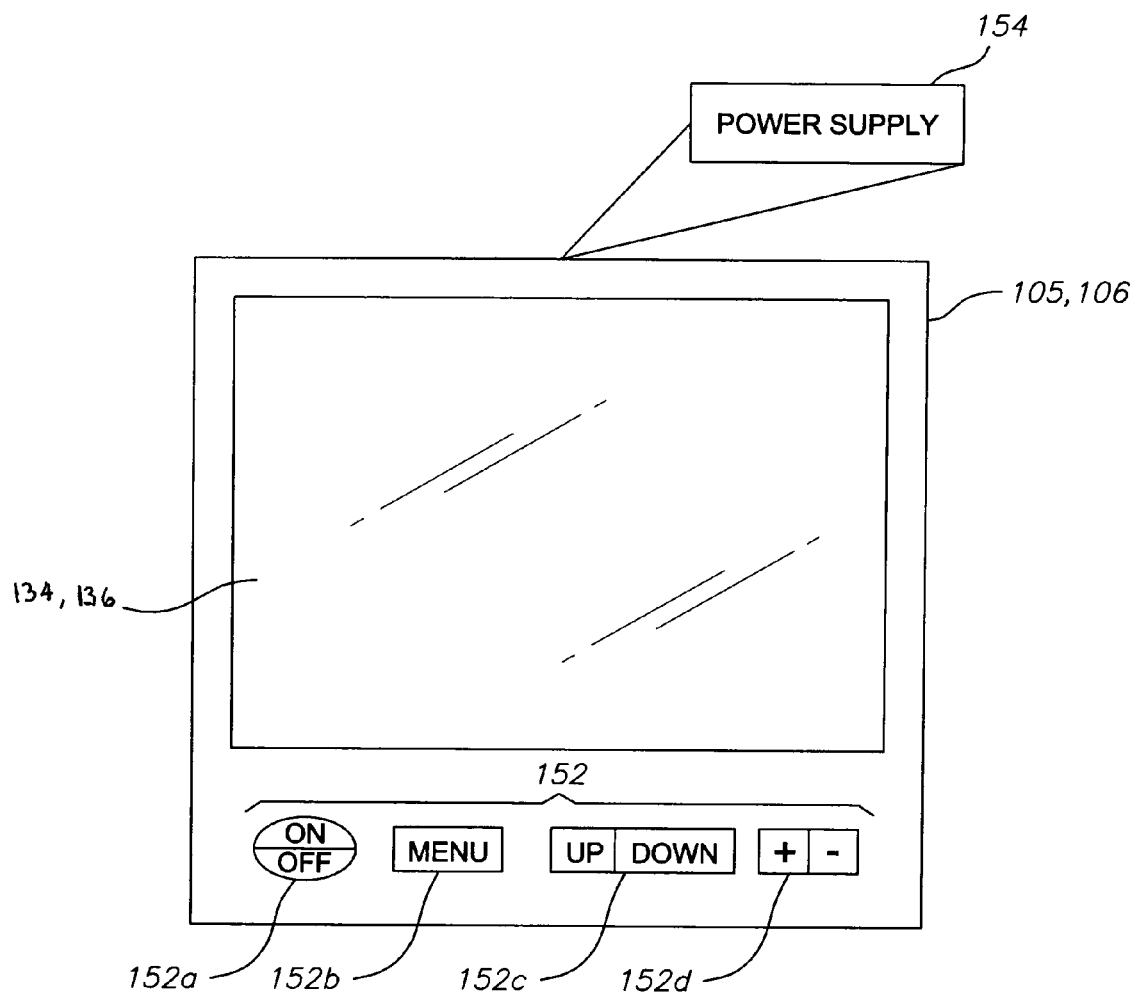
FIG. 7 is a more detailed illustration of a display device of the multiple document display apparatus of FIGS. 1-6 according to one embodiment of the invention.

FIG. 7 is a more detailed illustration of the display device 105 or 106 according to one embodiment of the invention. The display device 105/106 includes a display screen 134 or 136 that may take the form of a flat panel liquid-crystal-display (LCD) screen, plasma screen, or any other suitable display apparatus conventional in the art. Each display device 105/106 further includes various control buttons 152 that may be manipulated by the user for controlling the display device. The control buttons 152 may include, for example, a power on/off button 152a, a menu button 152b, an up/down select button 152c, and an adjust up/down button 152d. The control buttons 152 may be provided in addition to or in lieu of the control buttons 146 provided on the display stand 108. Pressure sensitive, such as touch screen, technology may also be incorporated into the display screen 134/136 for controlling the display device by merely touching certain portions of the screen.

The display device 105/106 also includes an internal and/or external power supply 154 that powers the display device. For example, the power supply 154 may take the form of an external AC adapter and/or a rechargeable battery unit. The power supply 154 may be provided in addition to or in lieu of the power supply 139 provided on the display stand 108.

One or more external ports 138 (FIGS. 3, 4) on the display device allows its coupling to the data processing apparatus 100. Such a coupling may occur via a wired or wireless mechanism using the wired or wireless data communications link 109 (FIG. 1).

Figure 8:
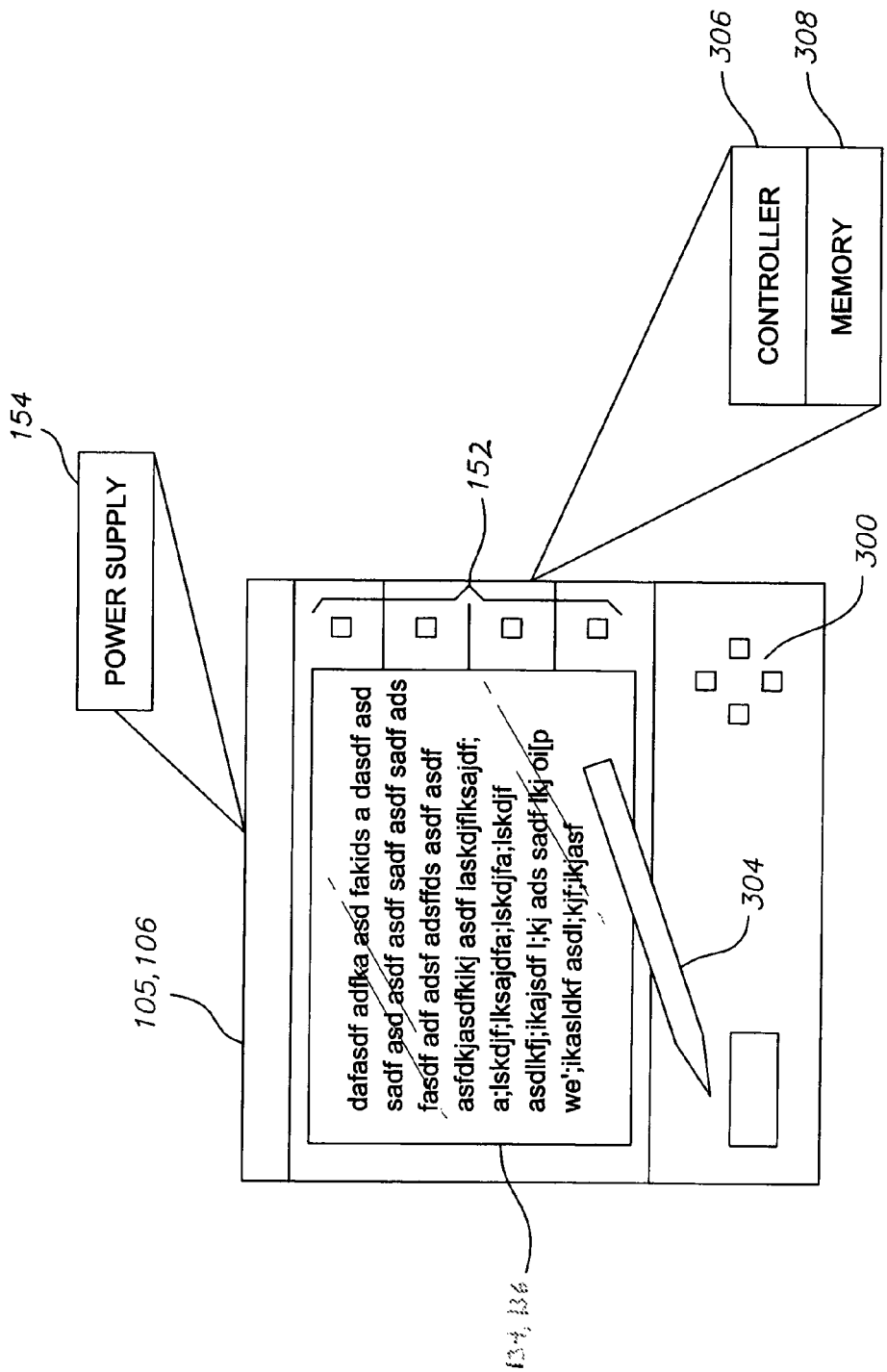
FIG. 8 is a more detailed illustration of a display device of the multiple document display apparatus of FIGS. 1-6 according to another embodiment of the invention.

FIG. 8 is a more detailed illustration of the display device 105 or 106 according to another embodiment of the invention. According to this embodiment, the display device 105/106 takes the form of a tablet-style computer, handheld PC, pocket PC, or personal digital assistant (PDA), that operates under the control of a microprocessor-based controller 306. The controller 306 performs any needed processing functions and controls operation of the display device 105/106 based on an application software stored in a local memory 308.

In addition to the display screen 134/136, control buttons 152, and power supply 154, the display device 105/106 further includes audio speakers 300 configured to transmit to the user any audio component processed by the controller 306. The display device may also include one or more user input devices such as, for example, a stylus or a pen 304. Other input devices may include a keyboard/keypad with a pointer device, an integrated microphone, a remote control device, and the like.

According to one embodiment of the invention, the display device 105 of the multiple document display apparatus 104 is configured according to the embodiment illustrated in FIG. 7, and the display device 106 of the multiple document display apparatus 104 is configured according to the embodiment illustrated in FIG. 8. According to this embodiment, display device 106 may be temporarily removed from the multiple document display apparatus 104 and transported to another location for approval of the document, suggestions, edits, and the like. Of course, a person of skill in the art should recognize that display device 105 may also be temporarily removed while a document is displayed on its display screen for similar purposes.

In operation, a user causes an electronic document to be displayed on the display device 106 by manipulating the keyboard 102 and/or mouse 103 on the data processing apparatus 100. The user then detaches the display device 106 from the display stand 108 of the multiple document display apparatus 104, and takes it to a second user for editing. The second user reviews the displayed document and makes editing annotations using the stylus or pen 304. The editing annotations, once made, are stored in the local memory 308.

According to one embodiment of the invention, the editing annotations are incorporated into the text of the document and visually highlighted for easy viewing. According to another embodiment of the invention, the editing annotations appear as comments on a separate window associated with the document. According to yet another embodiment of the invention, the editing annotations may appear as graffiti that is overlaid on top of the document at desired locations. For any of these embodiments, the editing is conducted under the control of the application software in the local memory 308.

After the second user is finished making all the desired editing annotations, the first user takes the display device 106 back to the multiple document display apparatus 104 and re-attaches it to the display stand 108. If the first user opts to accept the edits made by the second user, the edits may be either manually or automatically incorporated into the document upon receipt of a corresponding user input command entered via the keyboard 102 or mouse 103. The first user may continue working on the document by using the keyboard 102 and/or mouse 103 on the data processing apparatus 100.

Figure 9:
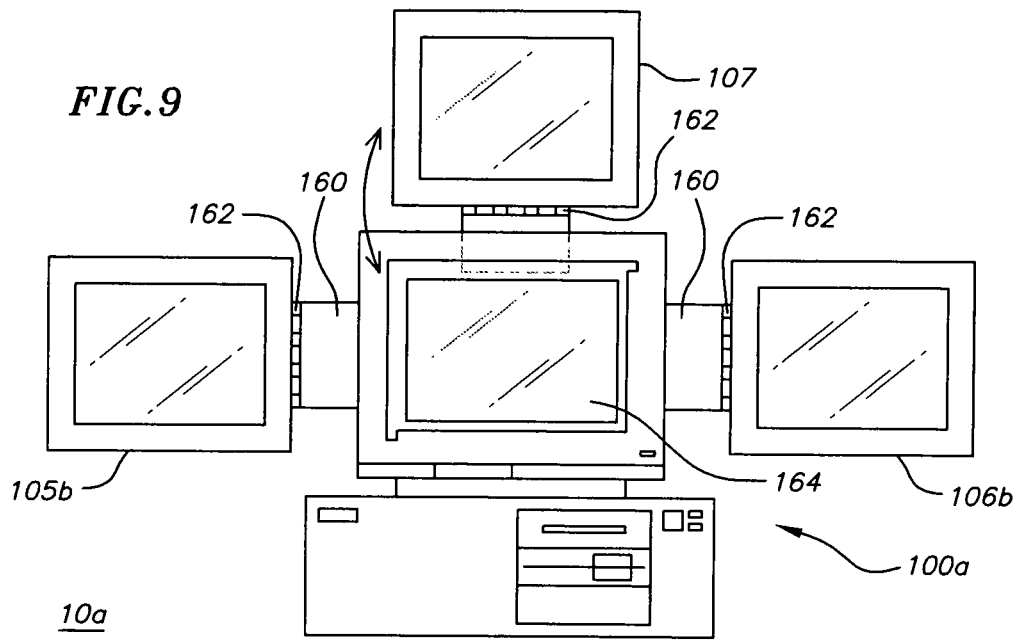
FIG. 9 is a block diagram illustrating a computer display system including a multiple document display apparatus in accordance with another embodiment of the present invention.

FIG. 9 is a computer display system 10*a* in accordance with another embodiment of the present invention. The computer display system 10*a* includes a data processing apparatus 100*a* and a multiple document display apparatus with display devices 105*b*, 106*b*, 107. The data processing apparatus 100*a* and display devices 105*b*, 106*b*, 107 may be similar to the data processing apparatus 100 and display devices 105, 106 of FIGS. 1-8. According to this illustrated embodiment, the display devices 105*b*, 106*b*, and 107 are mechanically coupled to the data processing apparatus 100 via a sliding assembly 160 and hinges 162. The sliding assembly 160 allows the display devices 105*b* and 106*b* to be slid behind the PC when not in use, providing a space saving capacity. Display device 107 may, according to one embodiment of the invention, also be slid up and down from behind the display monitor 164 when not in use.

The hinges 162 allow the display devices 105*b*, 106*b*, 107 to be angled into a position suitable for viewing by a viewer. The hinges 162 also allow the display devices 105*b*, 106*b*, 107 to be folded onto the data processing apparatus's display monitor 164 when not in use, and help protect the display monitor. The multiple document display apparatus with hinged display devices 105*b*, 106*b*, 107 may be integrated into the monitor 164 at the time of purchase of the monitor or data processing apparatus. The screen control software application 112 providing the screen control user interface 114 may also be integrated into a memory associated with the monitor 164, or provided with the monitor in an external storage device such as, for example, a CD, at the time of purchase of the monitor or data processing apparatus.

Figure 10:
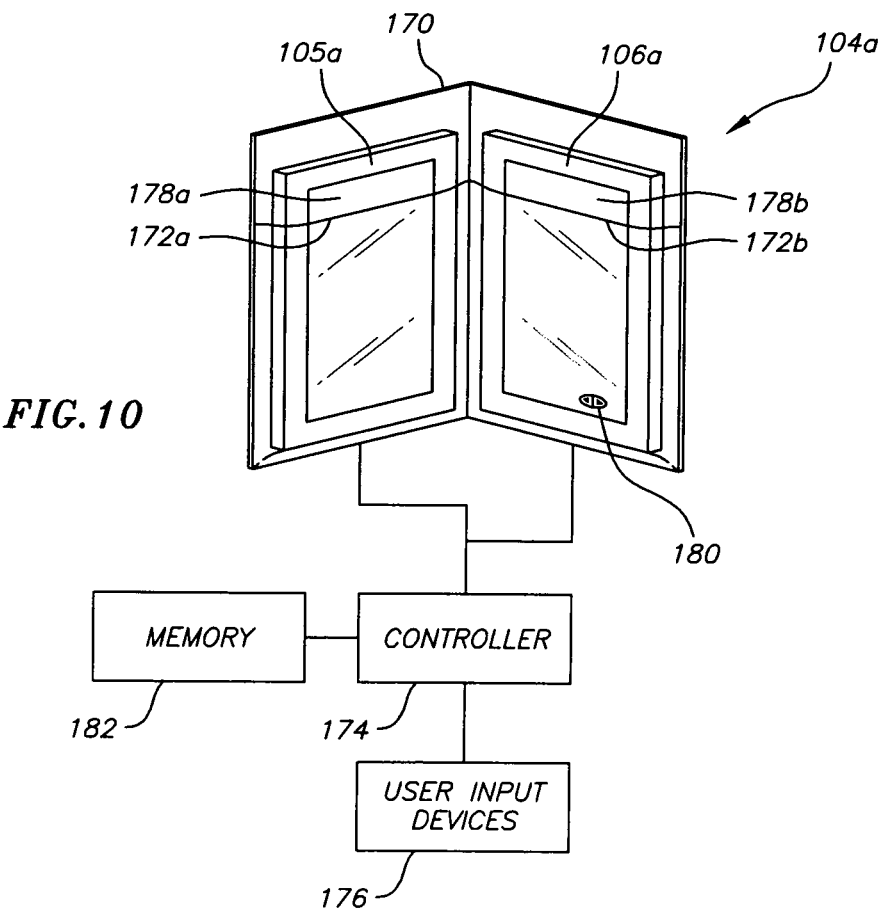
FIG. 10 is a semi-schematic block diagram of a multiple document display apparatus according to another embodiment of the invention.

FIG. 10 is a semi-schematic block diagram of a multiple document display apparatus 104*a* according to another embodiment of the invention. According to this illustrated embodiment, display devices 105*a*, 106*a*, which may be similar to display devices 105, 106 of FIGS. 1-8, are inserted into a portable case 170, such as, for example, a leather-type portfolio or binder. The portable case 170 includes pockets 172*a*, 172*b* for receiving the display devices 105*a*, 106*a* and holding the devices within the portable case. The pockets are manufactured with a material that allows a display screen 178*a*, 178*b* of each display device 105*a*, 106*a*, to be sufficiently visible when activated to transmit images thereon. The portable case 170 may also include a zipper or another fastening mechanism for securing the case into a closed position.

According to one embodiment of the invention, each display device 105*a*, 105*b* may operate under the control of a microprocessor-based controller 174 that may be similar to the controller 306 of FIG. 8. The controller 174 is coupled to a memory 182 and one or more user input devices 176. The memory 182 may include, for example, a flash memory card or memory stick for storing one or more documents to be displayed on the display devices 105*a*, 105*b*. The user input devices 176 may include one or more control buttons, keyboard, keypad, mouse, trackball, stylus, and/or pen. Touch screen technology incorporated into the display devices may allow additional input from a user.

According to one embodiment of the invention, the multiple document display apparatus 104*a* functions as an electronic book that may consecutively display the pages of a document stored in the memory 182. For example, page one of the document may appear on display screen 178*a*, and page two of the document may appear on display screen 178*b*. Selection of a turn page button 180 operating under the control of the controller 174 may allow page three of the document to appear on display screen 178*a*, and page four of the document to appear on display screen 178*b*. The turn page button 180 may be incorporated into one of the display screens 178*a* or 178*b*, or into one of the user input devices 176.

Figure 11:
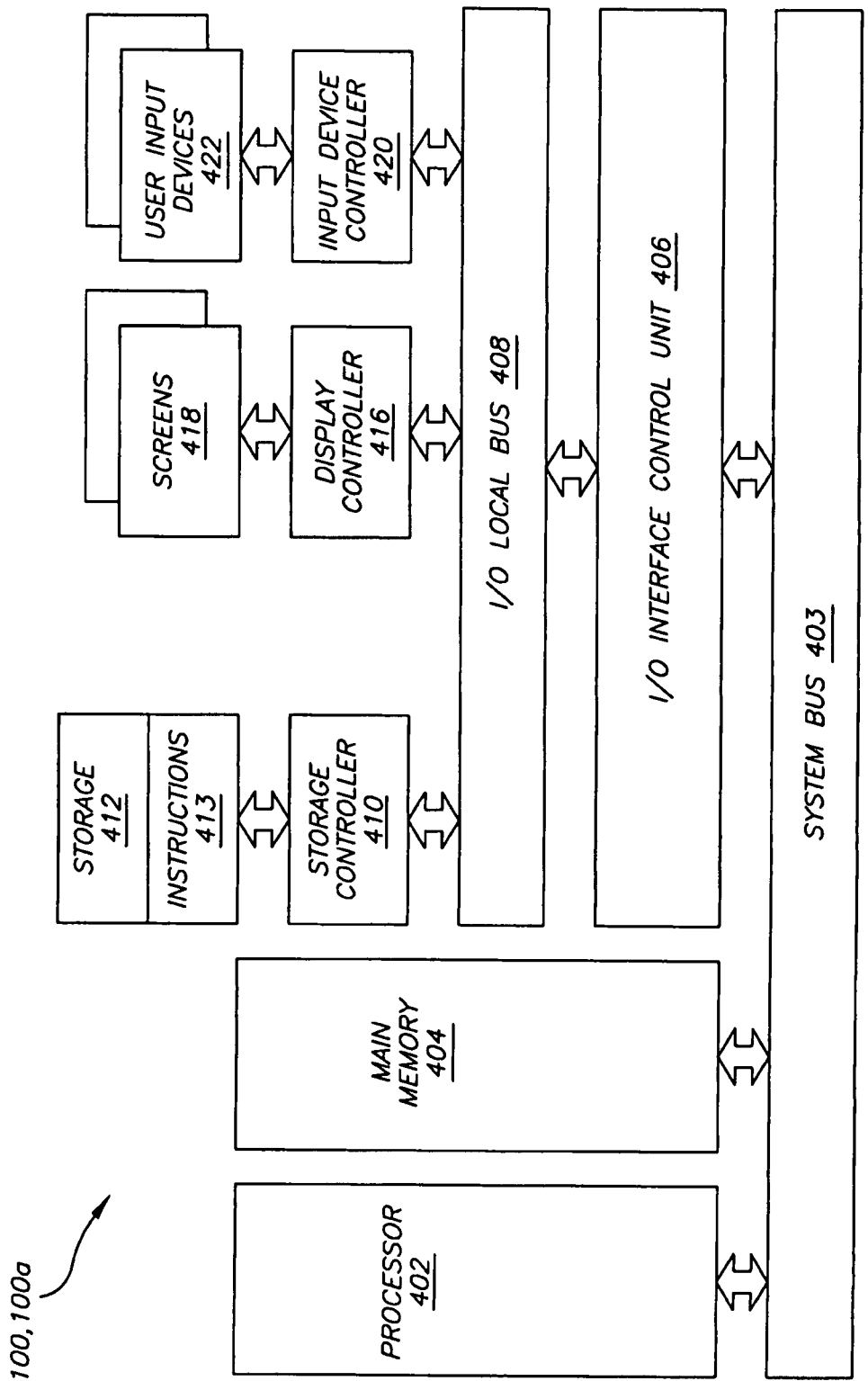
FIG. 11 is an architecture diagram of the data processing apparatus hosting a screen control software application according to one embodiment of the invention.

FIG. 11 is an architecture diagram of the data processing apparatus 100, 100*a*, hosting a screen control software application 112 that provides the screen control user interface 114 (FIG. 1) according to one embodiment of the invention. The screen control software application 112 provides the screen control user interface 114 used by a user to manipulate the display of documents on the display screen 101 of the data processing apparatus 100 as well as on the display screens 134, 136, 178*a*, 178*b* (collectively referred to as 134 and 136) of the display devices 105, 105*a*, 105*b*, 106, 106*a*, 106*b* (collectively referred to as 105 and 106).

The screen control software application 112 may be loaded from a variety of sources. For example, the software application 112 may be downloaded from a Wide Area Network (WAN) such as the Internet or supplied on a computer readable medium with the multiple document display apparatus 104, 104*a*, 104*b* (collectively referred to as 104). The screen control software application 112 operates as a "plug in" for any word-processing software application 112 used by a user to edit electronic documents. The screen control software application 112 may also be optionally hosted by one or more of the display devices 105, 106.

The data processing apparatus 100, 100*a* includes a processor 402 operatively coupled via a system bus 403 to a main memory 404 and an I/O interface control unit 406. The I/O interface control unit is operatively coupled via an I/O local bus 408 to a storage controller 410. The processor 402 is coupled via the I/O interface control unit 406, the I/O local bus 408, and the storage controller 410, to a storage device 412. Computer program instructions 413 associated with the screen control software application 112 is stored in the storage device 412 until the processor 402 retrieves the computer program instructions and stores them in the main memory 404. The processor then executes the computer program instructions stored in the main memory to implement a screen control user interface 114.

The data processing apparatus further includes a plurality of screens 418 coupled to the I/O local bus 408 via a display controller 416. The plurality of screens 418 may be the display screen 101 of the data processing apparatus, and display screens 134, 136 of the display devices 105, 106. The data processing apparatus uses the display controller 416 and screens 418 to display images, text, video, and the like. The screens 418 may be coupled to the display controller 416 via a Universal Serial Bus (USB) communications link or by any wired or wireless video display connection known in the art.

According to one embodiment of the invention, the processor maintains in a current screen register (not shown), an identifier of a display screen 101, 134, or 136 that is currently being interfaced with by the user. The processor also maintains, for each display screen, a list of windows or documents that have been opened for the display screen, an identifier of a currently active window or document for the display screen, a display mode (whether "maximized" or "minimized") for each window or document, and the like.

The data processing apparatus further includes one or more user input devices 422 coupled to the I/O local bus 408 via an input device controller 420. The user input devices 422 may include the keyboard 102 and mouse 103 of FIG. 1. A user may use a user input device 422 to interact with the screen control user interface 114 as allowed by the screen control software application 112.

Figure 12:
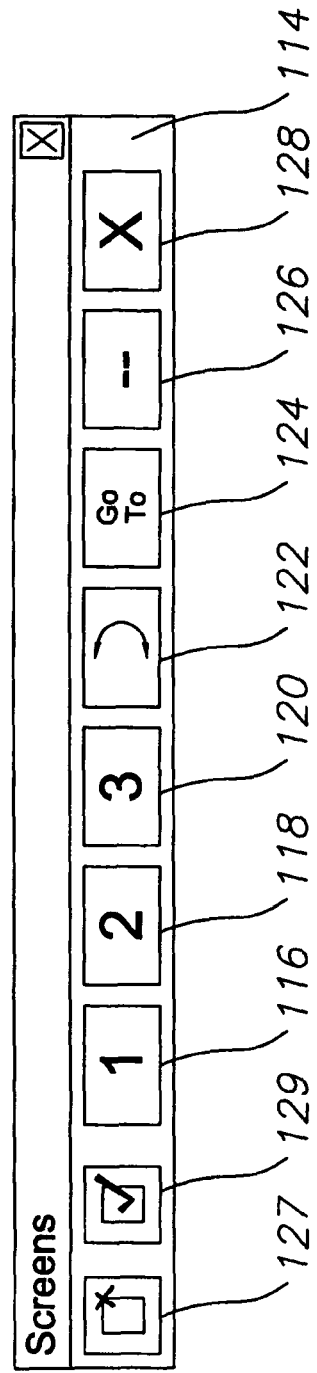
FIG. 12 is schematic diagram of the screen control user interface of FIG. 11 according to one embodiment of the invention.

FIG. 12 is a schematic diagram of the screen control user interface 114 according to one embodiment of the invention. The screen control user interface may be in the form of a menu bar having selectable icons for controlling the functions of the display screen 101 for the data processing apparatus 100 as well as the screens 134, 136 of the display devices 105, 106. For the purposes of the following discussion, display screen 101 is termed "screen 1," display screen 134 termed "screen 2," and display screen 136 termed "screen 3."

According to one embodiment of the invention, the menu bar includes selectable icons, such as, for example, screen buttons 116, 118, and 120, for selecting a particular screen. The screen buttons 116, 118, and 120 may display a number indicative of a screen to which the button is associated. For example, a number "1" displayed on screen button 116 indicates that it is associated with screen 1, number "2" displayed on screen button 118 indicates that it is associated with screen 2, and number "3" on button 120 indicates that it is associated with screen 3. A person of skill in the art should recognize, however, that there may be other ways of associating a particular button to a particular screen, such as for example, by a description of the screen or by the location of the screen.

The menu bar further includes operation selection icons 122-128 for selecting an operation to be applied to one or more selected screens. For example, a "switch" button 122 allows a person to move a window displayed on a current screen ("from" screen), to a target screen ("to" screen), making the target screen the working screen. Thus, if a user wants to move a document displayed on screen 1 to screen 2, and make screen 2 the working screen, the "switch" button 122 is selected followed by the screen 1 button 116, which in turn is followed by the screen 2 button 118. According to one embodiment of the invention, whatever is currently displayed on the "to" screen may further be moved to the "from" screen.

A "go to" button 124 allows a user to select a current working screen. For example, if the user who is currently working on a document displayed on screen 3 now wants to work on a document displayed on screen 1, the user may select the "go to" button 122 followed by the screen 1 button 118.

A "minimize" button 126 and a "close" button 128 allow the user to hide a document selected on a current working screen by moving it, minimizing it, or closing it.

According to one embodiment of the invention, the menu bar further includes a reject button 127 and an accept button 129 for respectively rejecting and accepting annotations made on a document displayed on screen 2 or 3 of the multiple document display apparatus. Selection of the reject or accept button may allow the user to traverse each annotation individually, and either reject or accept the annotation.

A person of skill in the art should recognize that instead of a menu bar with icons or buttons for implementing the screen control user interface 114, the interface may also be implemented via other user input devices, such as, for example, via assigned keys on the keyboard. For example, the "ALT-TAB" keys on the keyboard may be programmed to achieve the function of the "go to" button, where each successive selection of the "ALT-TAB" keys selects a different screen as the working screen in a round-robin fashion.

Figure 13:
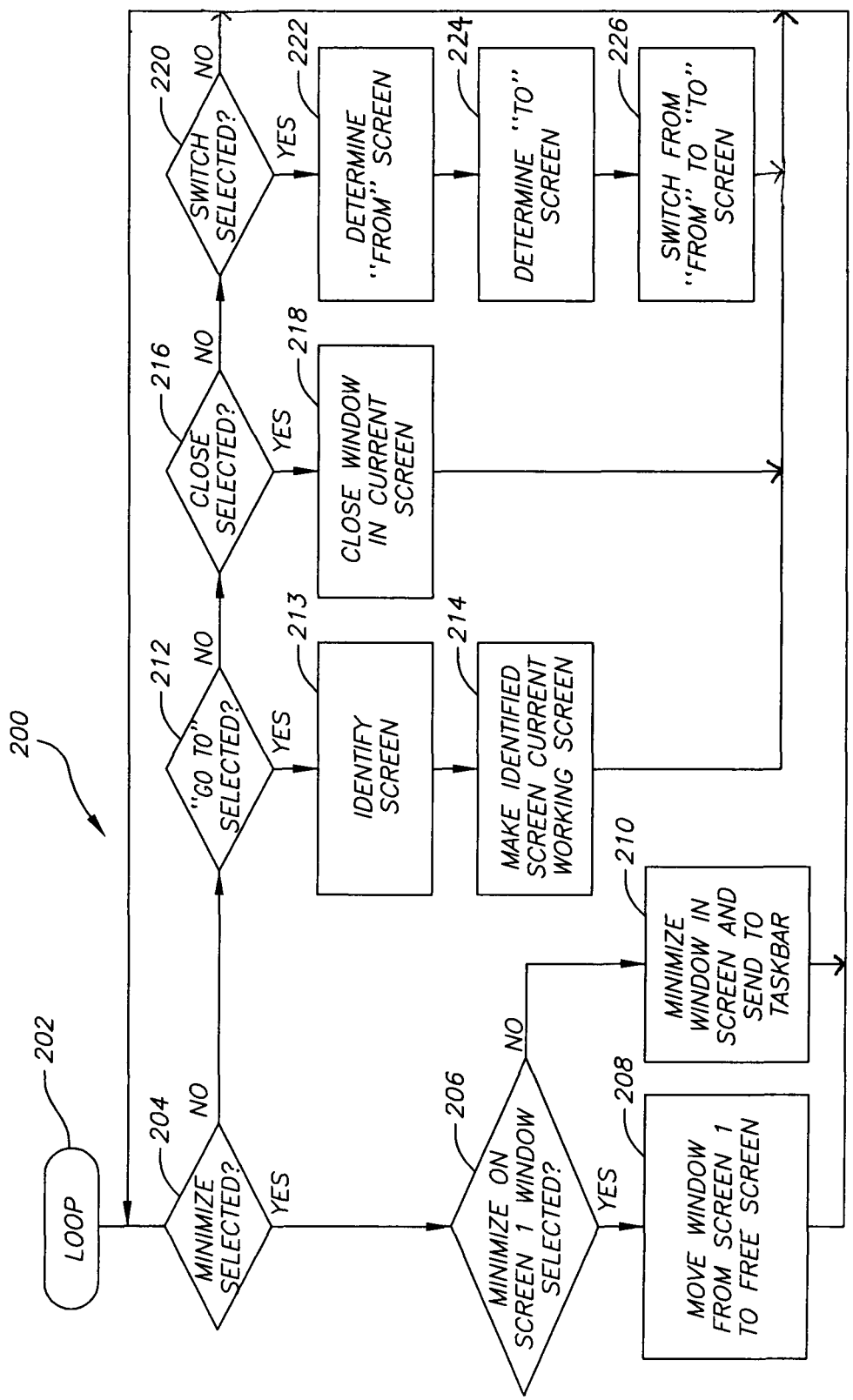
FIG. 13 is a process flow diagram of the screen control user interface of FIGS. 11-12 in accordance with an exemplary embodiment of the present invention.

FIG. 13 is a process flow diagram of the screen control user interface 114 in accordance with an exemplary embodiment of the present invention. The process may be implemented as computer program instructions 413 executed by the processor 402 in the data processing apparatus 100. A person of skill in the art should recognize, however, that the process may be implemented via hardware, firmware (e.g. via an ASIC), or in any combination of software, firmware, and/or hardware.

Furthermore, the steps of the process may be executed in the indicated order or in any other order recognized by a person of skill in the art.

A screen control user interface process 200 controls the selection and operation of the screens in the multiple document display apparatus 104. The screen control process may be implemented as a loop 202 that monitors menu selections made from the screen control user interface 114. In step 204, the process detects whether a "minimize" button 126 was selected by the user. If the answer is YES, a determination is made in step 206, by examining the current screen register, whether the current working screen is the screen on the data processing apparatus 100, that is, screen 1. If so, in step 208, instead of minimizing the window, the process simply moves the window to a free screen on the multiple document display apparatus 104. According to one embodiment of the invention, a screen is deemed to be free, or available, if no documents are displayed on it in either a "maximized" or "minimized" manner. The window and document information for the modified screens are also updated accordingly.

If no free screen exists, the window, in step 210, is minimized into a toolbar or taskbar on screen 1 in a manner conventional in the art.

If, however, upon the selection of the "minimize" button the current working screen is one of the screens of the multiple document display apparatus 104, the selected window is simply minimized in a conventional manner, and a selectable maximize icon (not shown) is displayed on the screen of the data processing apparatus, that is, screen 1. The display mode information for the minimized window is also updated accordingly. Selection of the maximize icon causes the window to be redisplayed on screen 1, or maximized on a screen of the multiple document display apparatus 104, that is, screen 2 or 3.

In step 212, a determination is made as to whether the user selected the "go to" button 124. If the answer is YES, a determination is further made in step 213 as to which screen button 116-120 was selected by the user. In step 214, the process updates the current screen register with an identifier for the selected screen, and makes the selected screen the current working screen.

In step 216, a determination is made as to whether the user selected the "close" button 128. If the answer is YES, the process closes or clears, in step 218, a current window in the current working screen. The closed window is then cleared from the list of windows and documents being tracked for the current working screen.

In step 220, a determination is made as to whether the user selected the "switch" button 122. If the answer is YES, the process assigns, in step 222, a first screen button selection as the "from" screen. A second screen button selection is assigned, in step 224, as the "to" screen. In step 226, the process changes or switches a window currently displayed on the "from" screen to the "to" screen. The window and document information for the "from" and "to" screens are also updated accordingly.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A computer system comprising:
a data processing apparatus including a first display screen, a first user input device, and a processor configured to be coupled to the first display screen and the first user input device, the processor configured to provide a graphics user interface including one or more operation selection icons on the first display screen; and
a first display device configured to communicate with the data processing apparatus, the first display device including a second display screen,
wherein the processor is further configured to apply a first operation with respect to the second display screen in response to a selection of a first operation selection icon on the graphics user interface using the first user input device,
wherein the first display device is configured to be operably detached from the data processing apparatus and invoked as a working screen,
wherein the first display device includes an application stored on local memory, and
wherein the application is configured to locally store and process input that is received when the first display device is detached from the data processing apparatus so that, responsive to the first display device being reattached to the data processing apparatus, the input stored on the local memory on the first display device can be further processed using the data processing apparatus.

2. The computer system of claim 1, wherein the first operation comprises one or more of:
moving an image between the first display screen and the second display screen;
invoking the second display screen as a current screen; or
hiding an image displayed on the second display screen.

3. The computer system of claim 1, further comprising a second display device configured to communicate with the data processing apparatus, the second display device including a third display screen.

4. The computer system of claim 3, wherein the processor is further configured to apply a second operation with respect to the third display screen in response to a selection of a second operation selection icon on the graphics user interface using the first user input device, wherein the second operation comprises moving an image between the second display screen and the third display screen.

5. The computer system of claim 1, wherein the first display device is configured to be mechanically coupled to the data processing apparatus.

6. The computer system of claim 1, further comprising a display stand, wherein the first display device is configured to be removably coupled to the display stand.

7. The computer system of claim 1, wherein the first display device further includes a controller, a memory, and a second user input device, the memory storing program instructions that, when executed, cause the controller to perform one or more of:
displaying an electronic document on the second display screen;
receiving an annotation with respect to the displayed electronic document, the annotation being entered via the second user input device;
displaying the annotation on the second display screen; or
storing the annotation in the memory.

8. A computer system comprising:
a display apparatus configured to communicate with a data processing apparatus, the display apparatus comprising:

a display stand;
a first display device configured to be mechanically coupled to the display stand, the first display device including a first display screen; and
a second display device configured to be mechanically coupled to the display stand, the second display device including a second display screen,
wherein the first display device and the second display device are configured to be mechanically decoupled from the display stand,
wherein when mechanically decoupled, each of the first display device and the second display device are configured to remain operable,
wherein the first display device and the second display device each include an application stored on local memory, and
wherein the application is configured to locally store and process input that is received when decoupled so that, responsive to the first or second display device being mechanically recoupled to the display stand, the input stored on the local memory of the first or second display device can be further processed.

9. The computer system of claim 8, wherein at least one of the first display device or the second display device is movably mountable on the display stand.

10. The computer system of claim 9, wherein at least one of the first display device or the second display device is rotatably mountable on the display stand.

11. The computer system of claim 10, wherein the first display device and the second display device are configured to wirelessly communicate with the data processing apparatus when decoupled from the display stand.

12. The computer system of claim 8, wherein each of the first display device and the second display device is configured to communicate with the data processing apparatus when decoupled from the display stand.

13. A computer system comprising:
a first display device including a first display screen; and
a data processing apparatus configured to communicate with the first display device, the data processing apparatus comprising:
a second display screen configured to display a graphics user interface;
a user input device useable to select a first operation selection icon from the graphics user interface; and
a processor configured to be coupled to the second display screen and the user input device, the processor configured to provide the graphics user interface on the second display screen and to apply a first operation with respect to the first display screen in response to a selection of the first operation selection icon,
wherein the first display device is configured to be operably detached from the data processing apparatus and invoked as a working screen,
wherein the first display device includes an application stored on local memory, and
wherein the application is configured to locally store and process input that is received when the first display device is detached from the data processing apparatus so that, responsive to the first data display device being reattached to the data processing apparatus, the input stored on the local memory can be further processed using the data processing apparatus.

14. The computer system of claim 13, wherein the first operation comprises one or more of:
moving an image between the second display screen and the first display screen;
invoking the first display screen as a current screen; or
hiding an image on the first display screen.

15. The computer system of claim 13,
wherein the data processing apparatus is configured to communicate with a second display device including a third display screen and to apply a second operation with respect to the third display screen in response to a selection of a second operation selection icon on the graphics user interface, and
wherein the second operation moves an image between the second display screen and the third display screen.

16. A method implemented at least in part by a computer, the method comprising:
displaying, on a first display screen of a data processing apparatus, a graphics user interface including one or more operation selection icons;
receiving, via a first user input device of the data processing apparatus, a selection of a first operation selection icon from the graphics user interface; and
responsive to receiving the selection, applying a first operation with respect to a second display screen of a first display device communicatively linked with the data processing apparatus,
wherein the first display device is configured to be operably detached from the data processing apparatus and invoked as a working screen,
wherein the first display device includes an application stored on local memory, and
wherein the application is configured to locally store and process input that is received when the first display device is detached from the data processing apparatus so that, responsive to the first display device being reattached to the data processing apparatus, the input stored on the local memory on the first display device can be further processed using the data processing apparatus.

17. The method of claim 16, wherein the first operation comprises one or more of:
moving an image between the first display screen and the second display screen;
invoking the second display screen as a current working screen; or
hiding an image displayed on the second display screen.

18. The method of claim 16, wherein the data processing apparatus is communicatively linked with a second display device including a third display screen, the method further comprising:
receiving, via the first user input device, a selection of a second operation selection icon from the graphics user interface; and
applying a second operation with respect to the third display screen in response to receiving the selection of the second operation selection icon, wherein the second operation moves an image between the second display screen and the third display screen.

19. The method of claim 16, wherein the first display device is configured to be coupled to a display stand and includes a second user input device, the method further comprising:
displaying an electronic document on the second display screen;

detecting detachment of the first display device from the display stand while the electronic document is displayed on the second display screen;

receiving an annotation with respect to the displayed electronic document, the annotation being entered via the second user input device while the first display device is detached from the display stand;

displaying the annotation on the second display screen; and storing the annotation.

20. A tangible computer-readable medium having instructions stored thereon, the instructions comprising:

instructions for displaying one or more operation selection icons on a first display screen of a data processing apparatus;

instructions for receiving, via a first user input device of the data processing apparatus, a selection of a first operation selection icon from the one or more operation selection icons; and instructions for, responsive to receiving the selection of the first operation selection icon, applying a first operation with respect to a second display screen of a first display device communicatively linked with the data processing apparatus, wherein the first display device is configured to be operably detached from the data processing apparatus and invoked as a working screen, wherein the first display device includes an application stored on local memory, and wherein the application is configured to locally store and process input that is received when the first display device is detached from the data processing apparatus so that, responsive to the first display device being reattached to the data processing apparatus, the input stored on the local memory on the first display device can be further processed.

21. The tangible computer-readable medium of claim 20, wherein the first operation comprises one or more of:

moving an image between the first display screen and the second display screen;

invoking the second display screen as a current screen; or hiding an image displayed on the second display screen.

22. The tangible computer-readable medium of claim 20, wherein the data processing apparatus is communicatively linked with a second display device including a third display screen, the instructions further comprising:

instructions for receiving, via the first user input device, a selection of a second operation selection icon from the one or more operation selection icons; and instructions for, responsive to receiving the selection of the second operation selection icon, applying a second operation with respect to the third display screen, wherein the second operation comprises moving an image between the second display screen and the third display screen.

23. The tangible computer-readable medium of claim 20, wherein the first display device is configured to be coupled to a display stand and includes a second user input device.

24. The tangible computer-readable medium of claim 23, the instructions further comprising one or more of:

instructions for displaying an electronic document on the second display screen;

instructions for detecting detachment of the first display device from the display stand while the electronic document is displayed on the second display screen;

instructions for receiving an annotation with respect to the displayed electronic document, the annotation entered via the second user input device while the first display device is detached from the display stand;

instructions for displaying the annotation on the second display screen; or instructions for storing the annotation.

25. A method implemented at least in part by a computer, the method comprising:

displaying, on a first display screen of a data processing apparatus, a graphics user interface;

displaying an electronic document on the first display screen;

receiving, via a first user input device of the data processing apparatus, a selection of a first operation selection icon from the graphics user interface;

responsive to receiving the selection of the first operation selection icon, moving a display of the electronic document from the first display screen to a second display screen of a display device, wherein the display device is configured to be operably detached from a display stand of a display apparatus communicatively linked with the data processing apparatus, wherein the display device includes an application stored on local memory, and wherein the application is configured to store and process input that is received when the display device is detached from the data processing apparatus so that, responsive to the display device being reattached to the data processing apparatus, the input stored on the local memory of the first display device can be further processed using the data processing apparatus;

detecting detachment of the display device from the display stand while the electronic document is displayed on the second display screen;

receiving, via a second user input device of the display device, an annotation with respect to the electronic document displayed on the second display screen while the display device is detached from the display stand;

displaying the annotation on the second display screen;

detecting reattachment of the display device to the display stand; and performing an operation on the electronic document displayed on the second display screen.

26. The method of claim 25, further comprising receiving, via the first user input device, a selection of a second operation selection icon from the graphics user interface.

27. The method of claim 26, wherein performing an operation on the electronic document is responsive to receiving the selection of the second operation selection icon.

28. The method of claim 25, further comprising displaying a second electronic document on the first display screen concurrently with displaying the electronic document on the second display screen.

29. A computer system comprising:

a data processing apparatus including a first display screen; and a first display device having a second display screen, the first display device being attachable to the data processing apparatus and being configured to, when detached from the data processing apparatus, be invoked as a working screen, wherein the first display device includes an application stored on local memory, and wherein the application is configured to locally store and process input that is received when the first display device is detached from the display processing apparatus so that, responsive to the first display device being reattached to the display processing apparatus, the input stored on the local memory on the first display device can be further processed.

30. A data processing apparatus comprising:
a housing including processing means;
means for storing data;
program means resident on the means for storing data, for enabling manipulation of information displayed by the data processing apparatus;
means for displaying information;
means for removably mounting the means for displaying information relative to the housing;
means associated with the means for displaying for enabling the means for displaying to remain operable and in communication with the processing means when the means for displaying is removed from the housing;
means for receiving input to the means for displaying when the means for displaying is removed from the housing; and
means for storing an application locally on the means for displaying,
wherein the application is configured to:
store and process the input locally on the means for displaying, and
responsive to the means for displaying being reattached to the housing, cause processing of the locally stored input using the data processing apparatus.

31. The data processing apparatus of claim 30, further comprising input means for enabling input to be provided to the means for displaying at least when the means for displaying is removed from the housing.

32. The data processing apparatus of claim 30, wherein the means for displaying information comprises multiple display screens.

33. The data processing apparatus of claim 30, wherein the means for enabling the means for displaying to remain operable and in communication comprises means for enabling wireless communication.

* * * * *

UNITED STATES PATENT AND TRADEMARK OFFICE
CERTIFICATE OF CORRECTION

PATENT NO. : 8,473,853 B2  
APPLICATION NO. : 11/748404  
DATED : June 25, 2013  
INVENTOR(S) : Gage Page 1 of 1

It is certified that error appears in the above-identified patent and that said Letters Patent is hereby corrected as shown below:

In the Drawings

In Fig. 2, Sheet 2 of 12, delete " 130 " and insert -- 130 --, therefor.

In Fig. 2, Sheet 2 of 12, delete " 108 " and insert -- 108 --, therefor.

In the Specification

In Column 5, Line 4, delete "power supply 139" and insert -- power supply 154 --, therefor.

Signed and Sealed this  
Thirteenth Day of May, 2014

Michelle K. Lee  
*Deputy Director of the United States Patent and Trademark Office*